United States Patent
France

[11] Patent Number: 5,642,902
[45] Date of Patent: Jul. 1, 1997

[54] RETROFIT AIRBAG SYSTEM FOR VEHICLES

[76] Inventor: John Josh France, 30600 Merry La., Lebanon, Oreg. 97355

[21] Appl. No.: 527,960

[22] Filed: Sep. 14, 1995

[51] Int. Cl.$^6$ ............................ B60R 21/26; B60R 21/18
[52] U.S. Cl. ............................ 280/737; 280/733; 137/38
[58] Field of Search ...................... 280/733, 734, 280/736, 737, 741; 137/38, 43, 68.11, 68.16, 68.19; 225/5

[56] References Cited

U.S. PATENT DOCUMENTS

| | | | |
|---|---|---|---|
| 2,755,125 | 7/1956 | Hodges | 137/38 |
| 3,158,149 | 11/1964 | Gray | 137/38 |
| 3,628,809 | 12/1971 | Cirillo | 137/38 |
| 3,637,110 | 1/1972 | Cirillo et al. | 137/38 |
| 3,752,500 | 8/1973 | Culver | 280/736 |
| 3,787,067 | 1/1974 | Bernard | 280/736 |
| 4,268,065 | 5/1981 | Granig | 280/737 |
| 4,288,005 | 9/1981 | Soo-Hoo | 222/5 |
| 4,771,914 | 9/1988 | Kaneda et al. | 222/3 |
| 4,971,354 | 11/1990 | Kim | 280/733 |
| 5,062,662 | 11/1991 | Cameron | 280/733 |
| 5,098,122 | 3/1992 | Breed et al. | 280/735 |
| 5,322,326 | 6/1994 | Ohm | 280/737 |
| 5,472,231 | 12/1995 | France | 280/733 |
| 5,474,328 | 12/1995 | Nilsson | 280/737 |

OTHER PUBLICATIONS

Line Precision Co., Ltd., "Airbag Challa" five-page instruction manual, circa 1992.

*Primary Examiner*—Paul N. Dickson
*Attorney, Agent, or Firm*—Klarquist Sparkman Campbell Leigh & Whinston, LLP

[57] ABSTRACT

A vehicle airbag system includes a pressurized gas source connected through a flow conduit to an airbag. A control member is disposed in a first position across the flow conduit to seal the flow conduit. The control member shifts by its inertia to a second activated position in response to a selected vehicle deceleration, to permit gas flow to the airbag. A burstable membrane in the conduit is supported by the control membrane in its first position and is unsupported in the second position.

12 Claims, 5 Drawing Sheets

RETROFIT AIRBAG SYSTEM FOR VEHICLES

TECHNICAL FIELD

The present invention is directed to an airbag system for motor vehicles.

BACKGROUND INFORMATION

Airbags have proved effective in protecting occupants of motor vehicles during accidents. New vehicles usually offer airbags for the driver's side, and sometimes passenger's side, of the vehicle front seat. Such airbags are installed within the vehicle steering wheel or dashboard. The airbag is usually activated by sensors positioned under the vehicle hood near the front of the vehicle. A predetermined impact activates the sensors, which communicate with a computer to direct the airbag inflation. Commonly, the ignition of a small amount of volatile chemical (such as sodium azide) produces gaseous nitrogen to inflate the airbag within about 0.05 seconds after an impact. Such airbags are typically made of opaque, carbon-reinforced plastic and deflate within a few hundredths of a second after inflation.

While such airbag systems usually provide excellent protection, disadvantages exist. The complicated electronics associated with airbags are vulnerable to malfunction, especially if exposed to heat, vibration, and corrosive elements under the hood of the vehicle.

For cars not factory equipped with airbags, retrofit airbag systems have been developed. However, the activation systems of these retrofittable airbag systems are generally less than satisfactory. U.S. Pat. No. 5,322,326 to Ohm shows a retrofittable airbag system with a complicated mechanical linkage that inflates the airbag by piercing a compressed gas canister seal during an accident. In addition to being expensive to produce, the series of moving parts in the mechanical linkage may yield unreliable and somewhat delayed airbag inflation. The piercing of the gas canister during system activation also delays airbag inflation. As a result of the delayed airbag inflation, only relatively small airbags offering limited protection may be practical with such a activation system.

Other retrofittable airbags are also less than satisfactory in that they may rely on malfunction-prone electronic or magnetic systems for airbag inflation. Such retrofit inflation systems also tend to activate relatively slowly, and inflate relatively small airbags that provide limited protection.

SUMMARY OF THE INVENTION

The present invention is directed to an airbag system and more particularly to one that is well-suited for retrofitting into a vehicle.

It is an object of the present invention to provide an improved airbag system with a reliable and inexpensive mechanical activation system.

A further object of the present invention is to provide an airbag system with an activation system with a minimum of moving parts.

Another object of the present invention is to provide an airbag system with an inexpensive compressed gas inflation source.

According to one embodiment of the present invention, a vehicle airbag system is provided with a compressed gas source connected through a flow conduit to an airbag. A control member is disposed in a first position across the flow conduit to seal the flow conduit. The control member shifts by inertia to a second activated position in response to a selected vehicle deceleration, thereby unsealing the flow conduit to permit gas flow to the airbag.

In another aspect of the present invention, a membrane may be positioned across the flow conduit to further seal the flow conduit when the control member is in the first position. The membrane is burst to unseal the flow conduit as the control member shifts to the second position.

In another aspect of the present invention, the control member has a aperture formed therethrough that is offset from the flow conduit when the control member is in the first position, and is aligned with the flow conduit when the control member is in the second position.

DESCRIPTION OF A PREFERRED EMBODIMENT

Figure 1A:
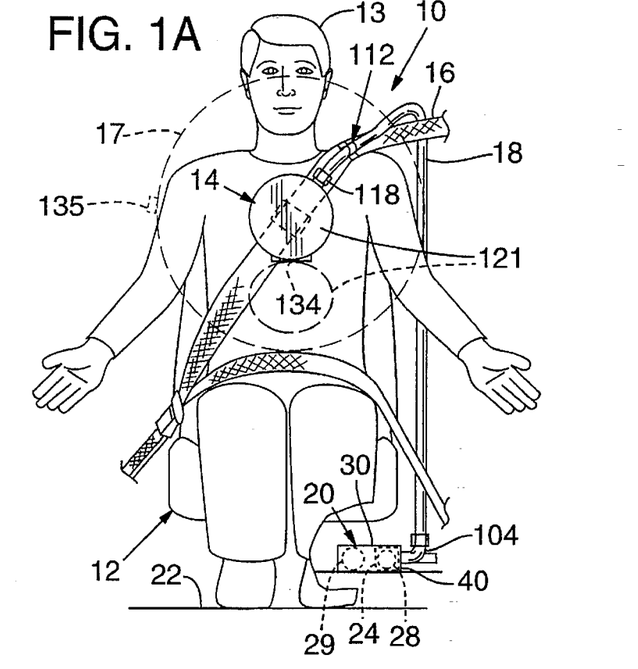
FIG. 1A is a front view of an airbag system in accordance with an embodiment of the invention, showing an airbag unit attached to an occupant's shoulder belt, with the inflated contour of the airbag shown with a dashed line, and the occupant being partially cut-away to show a control unit mounted beneath the occupant's seat.

A retrofit airbag system in accordance with a preferred embodiment of the present invention is designated in FIG. 1A with reference numeral 10. Although the present invention will be described in relation to a driver's seat 12, it is to be understood that the present invention may also be applied to all vehicle seats in all types of vehicles.

The airbag system has an airbag unit 14 attached to the driver's shoulder belt 16 that inflates away from the driver to focus protection over the upper body and head of the driver. The airbag unit 14 is connected through a flow conduit 15 that includes a flexible hose 18 to a compressed, or pressurized, gas source 19. The compressed gas source 19 is housed in an activation control unit 20 that is mounted on the vehicle floor 22 beneath the seat 12, or in various other selected locations within the vehicle.

Figure 3:
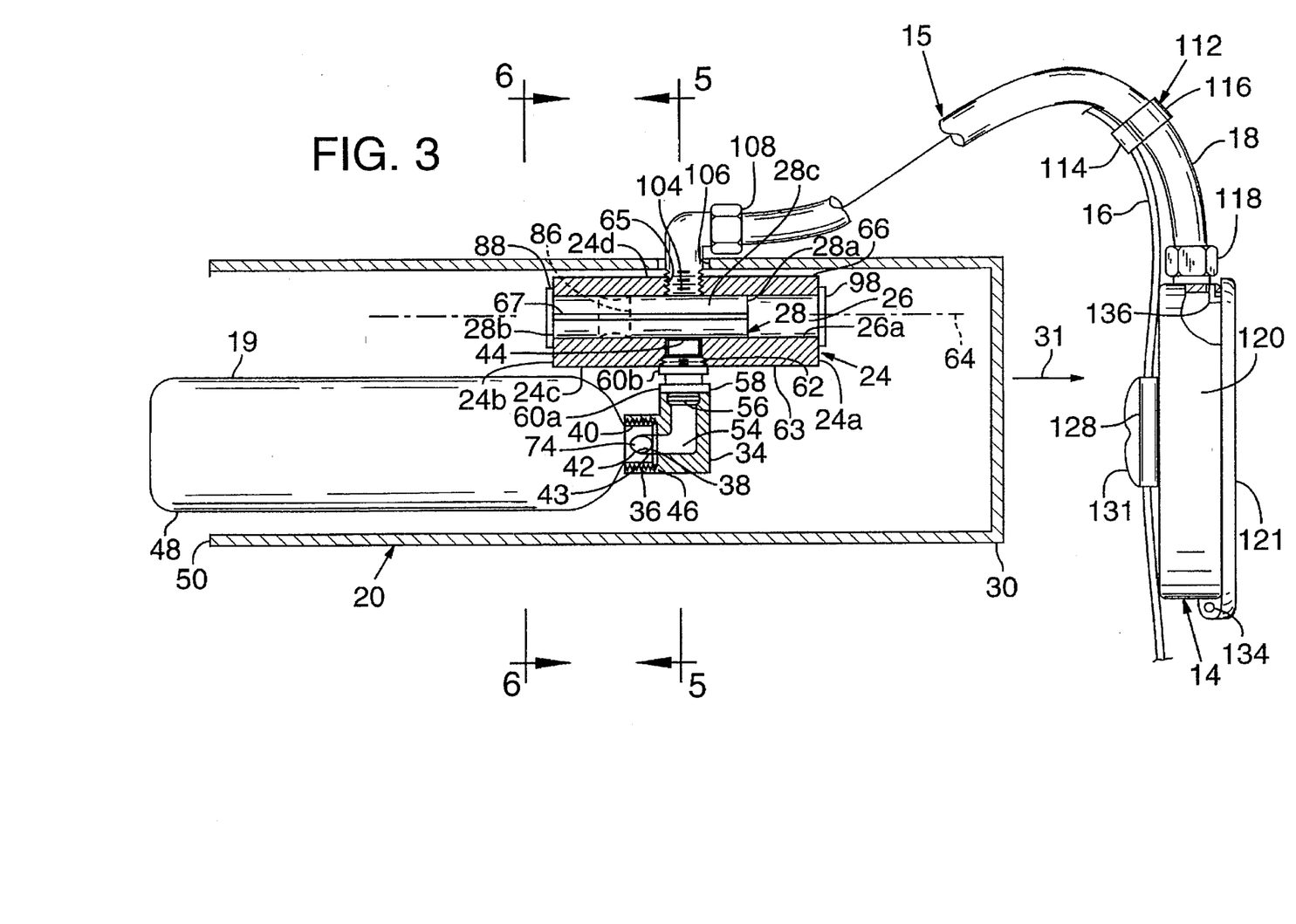
FIG. 3 is a partially cutaway view of the airbag system in accordance with an embodiment of the invention, showing a partially cut away top plan view of the control unit in an inactivated condition.
Figure 4:
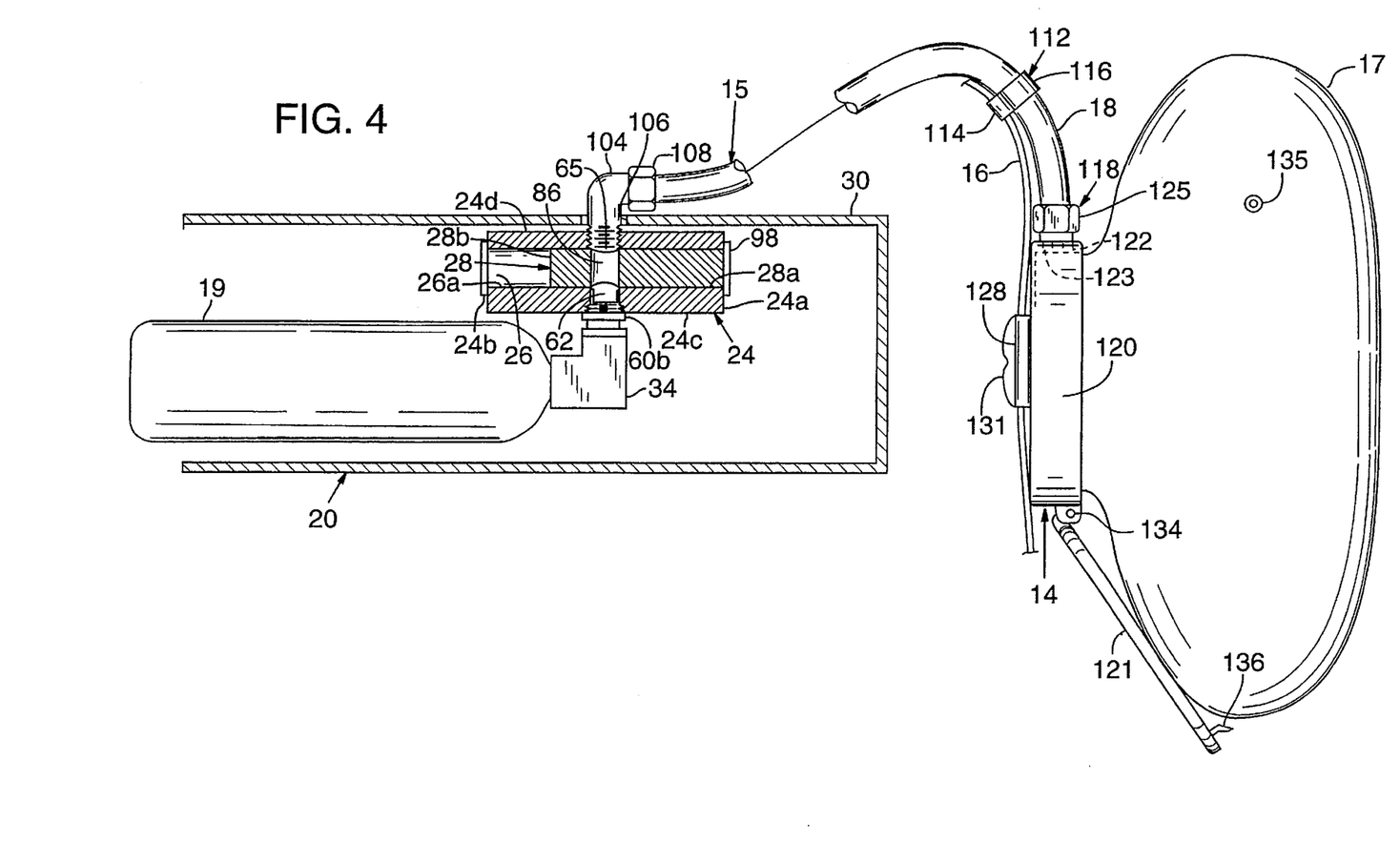
FIG. 4 is a view of the airbag system of FIG. 3, showing the control unit in an activated condition, and the airbag inflated.

As shown in FIGS. 3 and 4, the control unit 20 has a simple inertial activation means including an elongate control block 24 through which the flow conduit 15 passes. A valve cavity 26 extends longitudinally throughout the control block, and slidably holds a valve, or control member 28. The valve member 28 is closely fitted within the valve cavity, and is normally held in an inactivated position sealing the flow conduit 15. When the vehicle experiences a selected deceleration, the valve member slides within the valve cavity to an activated position to unseal the flow conduit, as will be described in greater detail below. The unsealed flow conduit 15 permits flow of compressed gas from source 19 to inflate the airbag 17 away from the occupant.

The detailed structure of the airbag system 10 will now be explained. As shown in FIG. 3, the control unit 20 has an elongate, box-like housing 30. The housing preferably is mounted beneath the seat 12 with its long axis aligned with the vehicle direction of movement (see directional arrow 31 in FIGS. 1B and 3). The housing 30 may be fastened to the vehicle 22 with screws or other fasteners.

Referring again to FIG. 3, the canister 19 is bottle-shaped with a neck 36 having external threads and a pierceable seal 38 that is threaded into a mounting block 34 mounted within the housing. The canister neck 36 is screwed into a screwed aperture 40 defined in the mounting block 34. A hollow tubular puncturing member, or tube, 42 extends from a terminal wall 43 of the threaded aperture toward the aperture opening. The puncturing tube 42 has a sharply angled inlet end 44 that punctures the canister seal 38 as the canister is threaded into the aperture 40. While the canister neck 36 screws snugly into the threaded aperture 40 to seal the canister, an O-ring seal 46 compressed between the top of the neck 36 and the aperture terminal wall 43 provides an additional sealed barrier. An end portion 48 of the canister 19 extends from the open rear side 50 of the housing for convenient manual canister installation and removal.

The opposite end of the puncturing tube 42 joins into an L-shaped conduit 54 defined within the mounting block 34. The opposite end of L-shaped conduit 54 has a threaded outlet aperture 56. A coupler nipple 58 with opposed, threaded ends 60a, 60b interconnects the control block 24 and the mounting block 34. Nipple end 60a screws into the mounting block outlet aperture 56.

The control block 24 preferably is of elongate rectangular shape with front and rear ends 24a, 24b, inboard and outboard sides 24c, 24d and is mounted within the housing 30. A gas inlet aperture 62 formed centrally in the inboard side 24 of the control block threadedly receives the nipple end 60b. A threaded gas discharge aperture 65 is formed centrally in the outboard side 24d of the control block opposite cavity from and in registration with the gas inlet aperture 62.

Figure 5:
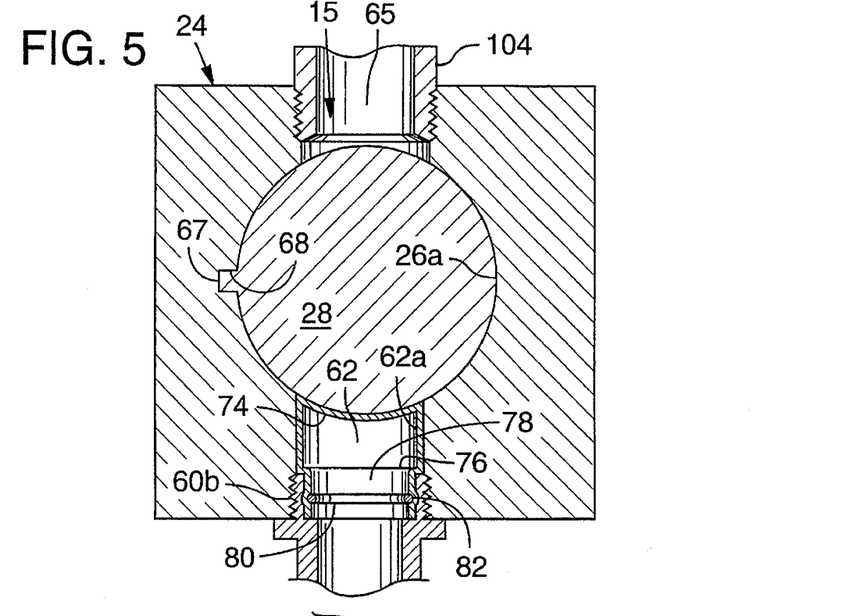
FIG. 5 is an enlarged partial view taken along line 5—5 in FIG. 3.

Referring to FIGS. 3 and 5, the control block 24 has an internal cylindrical wall 26a defining a cylindrical valve cavity or bore 26. The valve cavity has a central longitudinal axis defining an activation axis 64 that is generally aligned with the vehicle direction of motion 31, and along which the valve member 28 is slidable.

Referring again to FIGS. 3 and 5, the valve member 28 has a circular cylindrical shape with front and rear ends 28a, 28b, and a cylindrical sidewall 28c. It has a diameter complementary to and in close sliding relation with wall 26a of cavity 26. Thus, valve member 28 is adapted for snug but slidable positioning within the valve cavity 26.

The valve member has a longitudinal key protrusion 67, which is slidably mated with a corresponding longitudinal key recess 68 defined on the valve cavity wall 26a. The key protrusion 67 may extend along the entire length of valve member 28, as shown in FIG. 3, or may extend along only a portion of the valve member (e.g., key protrusion 67A on alternative valve member 28A in FIG. 7). The mating of the key protrusion and key recess thereby establishes the proper angular orientation, or position, of the valve member 28 within valve cavity 26.

In the inactivated position shown in FIG. 3, the cylindrical wall 28c of the valve member 28 seals the gas inlet aperture 62 and gas discharge aperture 65.

For complete sealing of the gas inlet aperture 62 (and thus the gas canister 19) when the airbag system is inactivated, a frangible, gas impermeable membrane 74 is mounted on the nipple end 60b. As best shown in FIG. 5, the membrane forms an impermeable seal over the outlet 76 of the nipple end 60b. The membrane 74 may be securely attached to the inner wall 78 of the fastener outlet 76 by an snap ring 80. The membrane 74 surrounds the periphery of the snap ring 80, and the snap ring is snapped into an annular groove 82 formed on the outlet inner wall 78. The membrane 74 thus is sealingly held between the snap ring 80 and the surface of the annular groove 82. It is also contemplated that the membrane could be attached directly to the internal wall 62a defining the inlet aperture 62.

When the valve member 28 is in the inactivated position shown in FIGS. 3 and 5, pressurized gas from the canister 19 expands the membrane 74 within the gas inlet aperture 62. The membrane is supported against the valve member cylindrical wall 28c and the inlet aperture wall 62a, and thus is not burst by the pressurized gas and seals flow conduit 15. The membrane 74 provides highly effective and long-lived seal for the inactivated airbag system. The membrane 74 is preferably made of a gas impermeable material that is flexible but frangible, in order to conform to the cylindrical wall 28c without breaking, but being immediately burst by gas pressure when the support of the cylindrical wall is removed. The membrane preferably also has a low elastic limit, in order to be immediately burst rather than substantially stretched through the flow conduit before bursting. Suitable membrane materials include latex rubber or silicone rubber with low elastic limits. A variety of metallic foils may also be used. Practically none of the pressurized gas is lost through diffusion across these types of membranes.

Referring to FIGS. 3 and 4, a valve aperture or bore 86 extends transversely through an intermediate portion of the valve member 28. The valve aperture 86 is cylindrical with a diameter approximately equal to those of the gas inlet aperture 62 and gas discharge aperture 65, and is angularly aligned with the gas inlet aperture and gas discharge aperture. In the inactivated position shown in FIG. 3, the valve member 28 is positioned to offset the valve aperture 86 well away from the gas inlet aperture 62 and the gas discharge aperture 65. In the activated position shown in FIG. 4, the valve aperture 86 is aligned with the gas inlet aperture 62 and gas discharge aperture 65 to permit airbag inflation.

Figure 6:
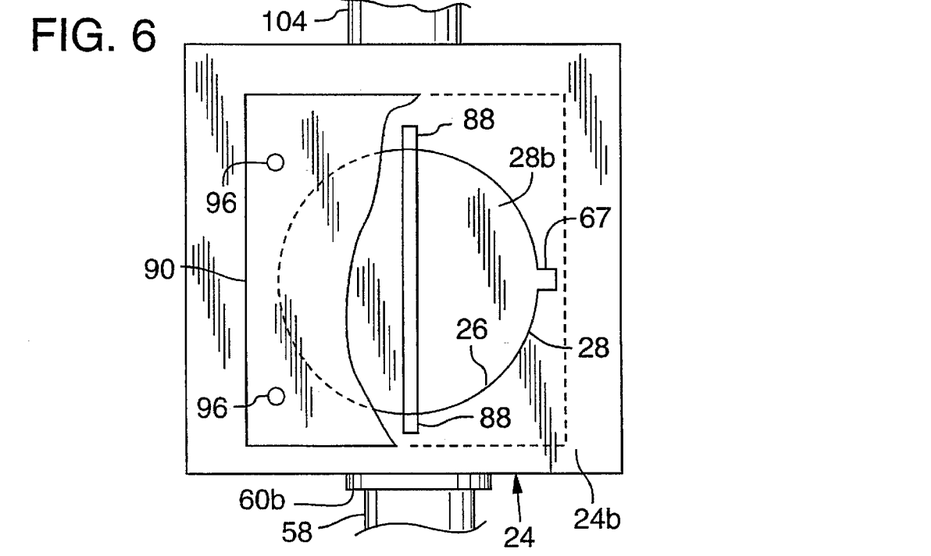
FIG. 6 is an enlarged partial view taken along line 6—6 in FIG. 3, with a plate portion cutaway to reveal underlying structure.

The valve member 28 may be held in the inactivated position by friction alone, or by means such as the shear tabs 88 and rear plate 90 system shown in FIGS. 3 and 6. The shear tabs 88 may be the opposite ends of a thin plastic member fastened to the rear end 28b of the valve member. The tabs 88 protrude radially from the valve member 28 to contact the rear end 24b of the control block 24, thereby preventing inadvertent forward motion of the valve member 28. The tabs 88 shear at a predetermined forward force to permit the valve member to move forward to the activated position (FIG. 4). As shown in FIG. 6, the rear plate 90 is mounted on the rear end 24b of the control block 24 by threaded fasteners 96 or the like. The tabs 88 may be received in recesses formed in the rear of the control block so as not to interfere with the mounting of the plate 90. The rear plate covers and seals the rear end of the cavity 26 to prevent inadvertent rearward motion of the valve member 28, and to prevent pressurized air leaks between the valve member and the cavity wall 26a when the valve member 28 is in the activated position and the membrane 74 is burst.

The valve member is shown in the activated position in FIG. 4. The valve member is sized such that the valve aperture 86 is registered with the gas inlet aperture 62 and gas discharge aperture 65 when the front end 28a of the valve member is flush with the front end 24a of the control block 24. The valve member 28 is held in the activated position by the force of the pressurized gas, and by a front plate 98 mounted to the control member front end 24a to cover a portion of the valve cavity 26. The front plate 98 also seals the front of the valve cavity 26 against leakage when the airbag is inflated.

Figure 7:
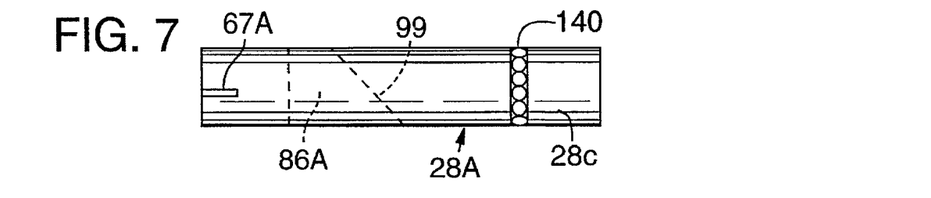
FIG. 7 is a top plan view of an alternative control member in accordance with another embodiment of the present invention.

An alternate valve member 28A with an alternate valve aperture 86A is shown in FIG. 7. The aperture 86A is partly defined by an angled front wall 99, which helps urge the valve member 28A into the activated position. The pressurized gas establishes a forward force vector on the angled front wall 99 as the valve member 28A moves toward the activated position to speed the movement of the valve member.

As shown in FIGS. 3 and 4, a first elbow fitting 104 is screwed into the discharge aperture 65 in outboard side 24d of control block 24. Fitting 104 protrudes through an aperture 106 in the outboard wall of the housing 30. The hose 18 is screwed to the opposite end of the fitting 104 by a compression nut 108.

Figure 1B:
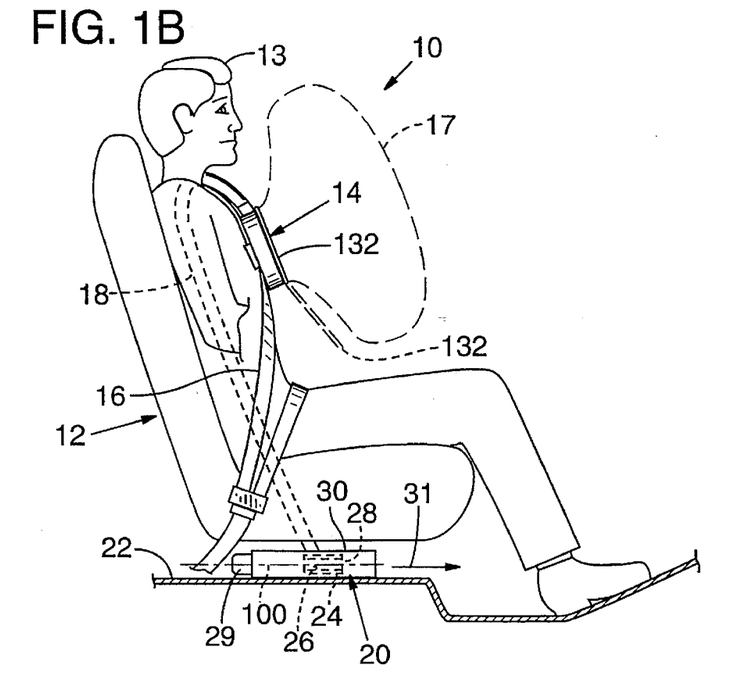
FIG. 1B is a side view of the retrofit airbag system of FIG. 1A.
Figure 2:
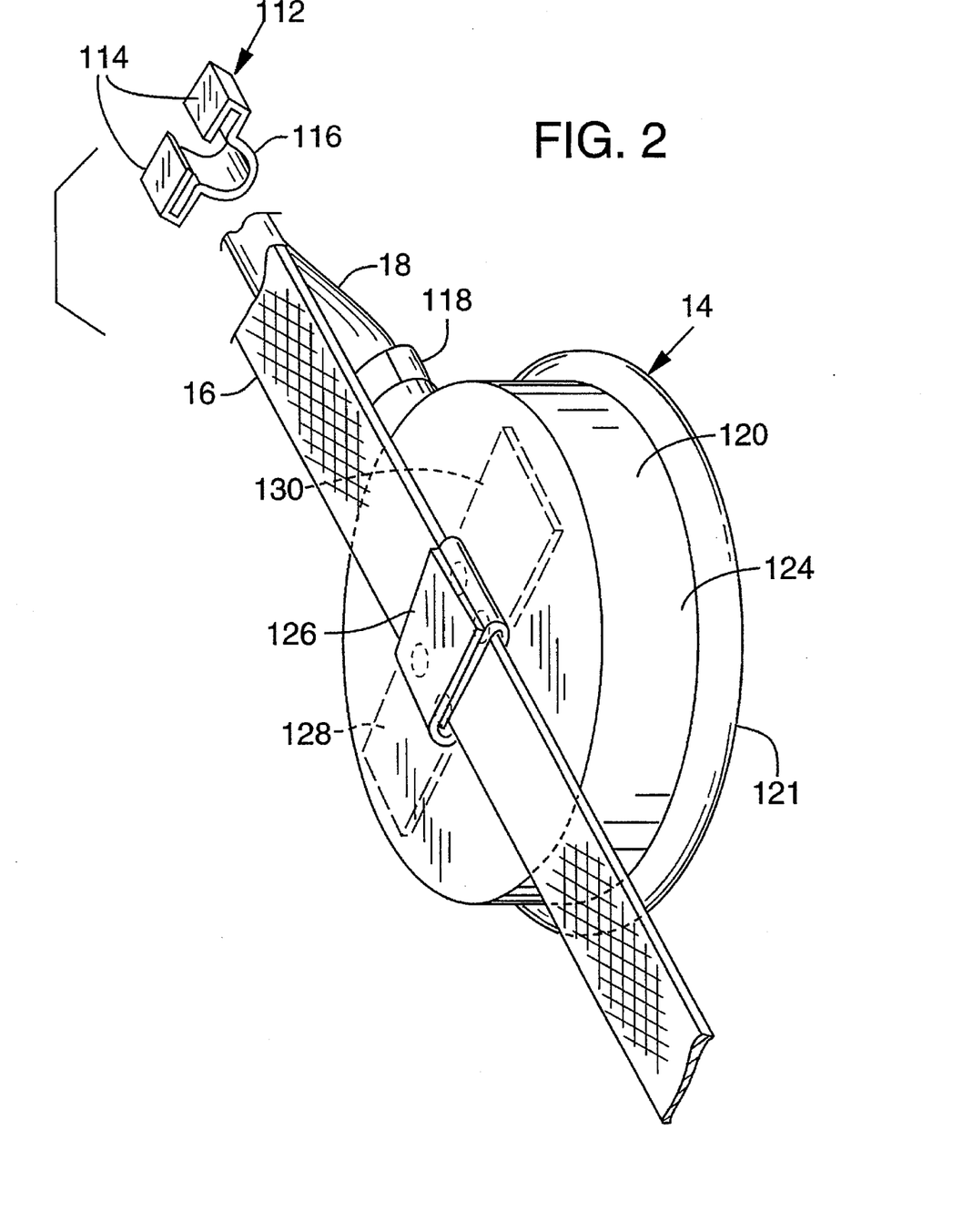
FIG. 2 is a perspective view of the airbag unit of the present invention showing the attachment of the airbag unit to the shoulder belt.

As best seen in FIGS. 1A and 1B, the hose 18 extends upwardly from the control unit 20 to the airbag unit 14 mounted on the shoulder belt 16. The hose 18 is attached to the shoulder belt 16 at about shoulder level by a bracket 112. As shown in FIG. 2, the bracket 112 has a pair of narrow opposed U-shaped portions 114 that open inwardly to snugly receive opposing sides of the shoulder belt 16. An arcuate bracket portion 116 connects the opposing U-shaped portions 114, and holds the hose 18 against the shoulder belt 16. The bracket 112 snugly mounts upon the shoulder belt 16, but may be manually slid along the shoulder belt 16 if adjustment is desired.

As best shown in FIGS. 1A and 4, the airbag unit 14 has a disk-like shape with a peripheral side wall 120 and a hinged front panel 121. As shown in FIG. 4, a second fitting 118 attaches the hose 18 to the airbag unit 14. The second fitting 118 has a threaded end 122 that screws directly into an airbag aperture 123 in the side wall 120. A compression nut 125 seals the hose to the opposite end of the second fitting 118. The airbag 17 is sealed about the airbag aperture 123 to permit direct fluid communication between the hose 18 and the interior of the airbag 17.

The hose 18 also may be provided with an integral threaded end that threads directly into the airbag unit 14.

The airbag unit is attachable to the shoulder belt 16 by attachment means, such as attachment strap 126 (see FIG. 2). The attachment strap 126 is preferably made of leather or another flexible material for wrapping around the shoulder belt 16. The strap 126 has two opposing end portions 128, 130 that wrap over the back (users's side) of the shoulder belt 16 and attach to each other by Velcro®, snaps, or other fasteners. The tight wrapping of the attachment strap 126 around the shoulder belt 16 provides secure mounting of the airbag unit 14, while allowing its slidable adjustment along the shoulder belt 16.

If desired, the airbag unit 14 may be fixed on the shoulder belt 16 by clips or other fasteners. For comfort, a thin pad 131 (FIGS. 3 and 4) may be attached to the strap end portion 128 that rests against the user.

The airbag unit 14 is compact and holds the airbag 17 compactly folded therein. As shown in FIG. 4, the front panel 121 is hinged to a bottom edge of the side wall at hinge 134. The front panel 121 is normally held shut by snap means, such as a plastic shear pin 136. The shear pin 136 is held in an interior portion of side wall 120 when the front panel 121 is closed, and breaks as the front panel 121 opens. Thus, the shear pin 136 shown in FIG. 4 is broken. The breakage of the shear pin 136 is irreversible to render the airbag unit inoperable once the front panel is opened. Thus, the breakable shear pin 136 offers a safeguard against unauthorized repair or servicing of the airbag unit.

The airbag 17 is centrally positioned adjacent the center of the chest of the user 13 to focus protection on the most vulnerable body portions—i.e., the head and upper body. The airbag unit 14 retains such position relative to the driver as the driver is thrown forward during an accident. The maintenance of the airbag position permits the preferred airbag to be relatively small (about 20 inches diameter by 10 inches thickness) and still offer excellent protection. The small volume of the present airbag 17 permits rapid inflation, and compact folding within the airbag unit 14. Thus, the airbag unit 14 may be compact and easily carried on the shoulder strap 16.

OPERATION

In the preferred embodiment, the selected deceleration sufficient to activate the system and deploy the airbag corresponds to a front-end collision at about 22 mph. In the event of the selected vehicle deceleration, the forward inertia of the valve member 28 overcomes the frictional resistance of the valve member 28 against the valve cavity wall 26a and, if tabs 88 are used, release such tabs. As shown in FIG. 4, the valve member 28 slides forward into abutment with the front plate 98 to align the valve aperture 86 with the gas inlet aperture 62 and gas discharge aperture 65, thereby unblocking the flow conduit 15. As the valve member cylindrical wall 28c support of the membrane 74 is removed, the pressurized gas simultaneously bursts the unsupported membrane 74 to unseal the flow conduit. Gas flows through the valve aperture 86, gas discharge aperture 65, and hose 18 to inflate the airbag 17.

The airbag 17 generally inflates away from the upper body of the user 13. The front panel 121 opens harmlessly downward and away from the upper body of the user 13. Thus, the present airbag 17 will not "punch" a driver who is bent forward before the airbag is inflated, and is less capable of projecting loose items at the driver.

The airbag 17 may automatically deflate after an accident, or remain inflated to provide protection against secondary impacts, such as occur in "chain collision" accidents. A manual valve 135 may be conveniently provided on the airbag 17 to permit manual deflation by the driver. The airbag 17 may be made of transparent plastic material, such as mylar, that permits the driver to see through the inflated airbag.

The preselected deceleration level may be varied. For instance, the coefficient of friction between the cylindrical wall 72 of the valve member 28 and the internal wall 26a of the valve cavity 26 will influence the sensitivity of the airbag system. To lower the selected deceleration level, either or both of the valve member 28 and valve cavity internal wall 26a may be coated with teflon™, or other low friction coating. Alternatively, as shown in FIG. 7, the valve member 28A may be provided with an annular bearing 140, which may be of roller type, to provide for reliable valve member movement at the selected deceleration. The annular bearing 140 is mounted in an annular groove formed on the valve member 28A such that the roller surface of the bearing is just beyond the periphery of the cylindrical surface 28c.

The selected deceleration level is also lowered by reducing the shear strength of the shear tabs 88. Another way to lower the selected deceleration level is to decrease the canister gas pressure and/or the diameter of the gas inlet orifice 62, both of which decrease the lateral force on the valve member 28 in the inactivated position.

The gas canister 19 of the present invention may be any of a variety of Department of Transportation (DOT) approved canisters. The gas canister volume and pressure generally will be dependent upon the size of the airbag 17, with a larger airbag requiring a larger canister and/or a higher canister pressure. One preferred canister pressure is about 3000 p.s.i., which should inflate airbag 17 to a pressure of around 7–10 p.s.i.

It is also contemplated that, in addition to circular, the valve member could have an oval, rectangular, square, or other cross-sectional shape.

For added durability and corrosion resistance, components of the airbag system, such as the control block 24, valve member 28, and the hollow fasteners 60a, 60b may be made of stainless steel. Other durable materials will work as well.

The hose 18 is preferably of a high-pressure-type for flexibility, toughness, and reliability. For added toughness, the hose may be sheathed in a steel braid. A longer hose tends to delay the airbag inflation. Thus, the activation means sensitivity may have to be increased, as described above, when a relatively long hose is used.

Furthermore, while the described airbag systems activate upon a front-end collision, the control block 24 and valve member 28 could be oriented in other directions to actuate in the cases of side or rear collisions.

The foregoing has been described in connection with a preferred embodiment. It will be appreciated by one of ordinary skill in the art, however, that various modifications and variations may be substituted for the mechanisms described herein while remaining defined by the appended claims and their equivalents.

I claim:

1. An activation system for inflating an airbag in a vehicle, comprising:

a pressurized gas source adapted to be connected through a flow conduit to said airbag;

a gas-impermeable burstable membrane extending across the flow conduit; and a control member mounted for shifting along an activation axis that is generally aligned with the vehicle direction of travel solely in response to a selected vehicle deceleration, between a first position in which the control member extends across the flow conduit and supports the membrane such that the membrane seals the flow conduit, and a second position wherein the control member support for the membrane is removed such that the membrane is immediately burst to permit gas flow through the flow conduit to the airbag.

2. The system of claim 1, wherein the membrane has a low elastic limit to burst without substantial stretching in the flow conduit.

3. The system of claim 1, wherein the pressurized gas source supplies gas at a selected pressure sufficient to produce a force on said membrane which is substantially greater than the elastic limit of the membrane.

4. An activation system for inflating an airbag in a vehicle, comprising:

a pressurized gas source adapted to be connected through a flow conduit to said airbag;

a control block having a cavity defined therein by a cavity wall and having a gas inlet aperture defined in a first side of the control block and a gas discharge aperture defined in an opposite second side of the control block, a gas impermeable membrane disposed over said gas inlet aperture capable of being burst by gas pressure from said gas source when the membrane is unsupported, a control member having a valve aperture therein slidably mounted in said cavity between said gas inlet and discharge apertures for sliding along an activation axis that is generally aligned with the vehicle direction of travel, said control member being shiftable solely by inertia of the control member at a selected vehicle deceleration between first and second positions, said control member when in its first position extending across the conduit to inhibit flow of gas to the airbag and providing support for said membrane, and when in its second position having said valve aperture aligned with said membrane and said inlet and discharge apertures to remove support from said membrane allowing it to be burst by gas pressure to permit gas to flow through said apertures to said airbag.

5. The system of claim 4, wherein said gas inlet and discharge apertures open into said cavity at opposite sides of said activation axis and said valve aperture extends through said control member substantially normal to said activation axis.

6. The system of claim 4, wherein the membrane is made of a flexible material that has a low elastic limit in order to be immediately burstable by gas pressure without substantial stretching through the flow conduit when the support of the control member is removed.

7. The system of claim 4, wherein the cavity has a cylindrical shape, and the control member has a closely complementary cylindrical shape.

8. The system of claim 4, wherein at least one of the cavity wall and the control member are coated with a substance having a low coefficient of friction to facilitate sliding of the control member.

9. An activation system for inflating an airbag in a vehicle, comprising:

a pressurized gas source adapted to be connected through a flow conduit to said airbag;

a control block having a cavity defined therein by a cavity wall, a control member in the cavity for sliding along an activation axis that is generally aligned with the vehicle direction of travel, the control member having a first position in which the control member extends across the conduit to inhibit the flow of gas to the airbag, and being shiftable by inertia of the control member at a selected vehicle deceleration to a second position in which gas is permitted to flow to the airbag, and an annular bearing is interposed between the cavity wall and the control member to facilitate sliding of the control member.

10. An activation system for inflating an airbag in a vehicle, comprising:

a pressurized gas source adapted to be connected through a flow conduit to said airbag;

a control block having a cavity defined therein by a cavity wall, a control member in the cavity for sliding along an activation axis that is generally aligned with the vehicle direction of travel, the control member having a first position in which the control member extends across the conduit to inhibit the flow of gas to the airbag, and being shiftable by inertia of the control member at a selected vehicle deceleration to a second position in which gas is permitted to flow to the airbag, and wherein one of the control member and the control block further has a key protrusion defined thereon that is mated in an elongate key recess extending parallel to said activation axis formed in the other of the control member and the control block, the mating of the key protrusion and the key recess controlling angular orientation of the control member within the cavity about the activation axis.

11. An airbag system for a vehicle, comprising an airbag;

a pressurized gas source comprising a canister of compressed gas having a seal initially sealing the canister connected through a flow conduit to said airbag;

a control member extended along the conduit and mounted for shifting between a first position wherein the control member inhibits the flow of gas to the airbag and a second position wherein gas is permitted to flow to the airbag, the control member being mounted for shifting along an activation axis that is generally aligned with the direction of movement of the vehicle, the control member shifting from the first position to the second position by inertia of the control member when the vehicle experiences a selected deceleration, and a mounting member to which the canister is connected, the mounting member having a puncture member for puncturing the canister seal when the canister is connected to the mounting member.

12. An airbag system according to claim 11, wherein the airbag is stored within a storage unit that is attachable to a vehicle seat belt, the airbag being inflatable forwardly from the seat belt.

\* \* \* \* \*

UNITED STATES PATENT AND TRADEMARK OFFICE
CERTIFICATE OF CORRECTION

PATENT NO. : 5,642,902
DATED : OCTOBER 27, 1997
INVENTOR(S) : JOHN J. FRANCE

It is certified that error appears in the above-identified patent and that said Letters Patent is hereby corrected as shown below:

On the cover page of the patent, inventor's middle name "Josh" should read --Jeah--.

Signed and Sealed this

Thirtieth Day of December, 1997

Attest:

BRUCE LEHMAN

Attesting Officer

Commissioner of Patents and Trademarks